April 8, 1969     W. B. SCHMITZ     3,436,774
WATERCRAFT

Filed Jan. 9, 1968     Sheet _1_ of 5

INVENTOR
WILLIAM B. SCHMITZ
BY
*Albert H. Fockabee*
ATTORNEY

INVENTOR
WILLIAM B. SCHMITZ
BY
*Allant Flockabee*
ATTORNEY

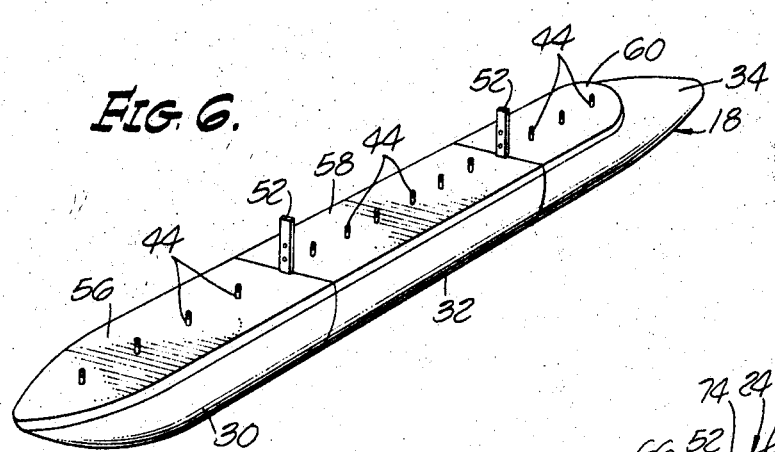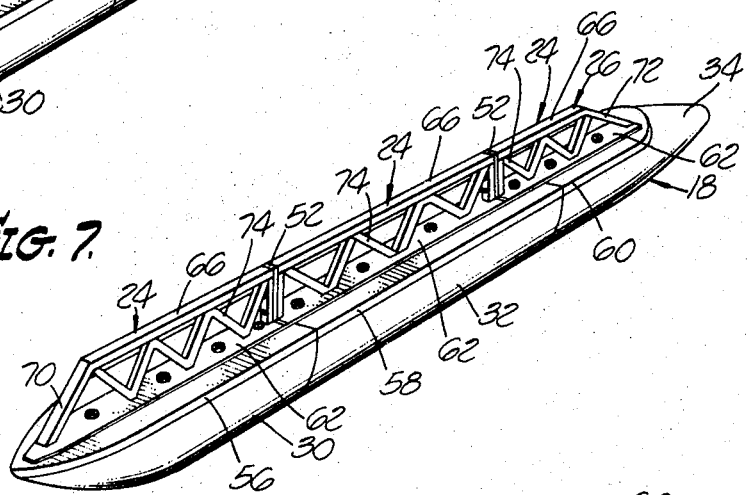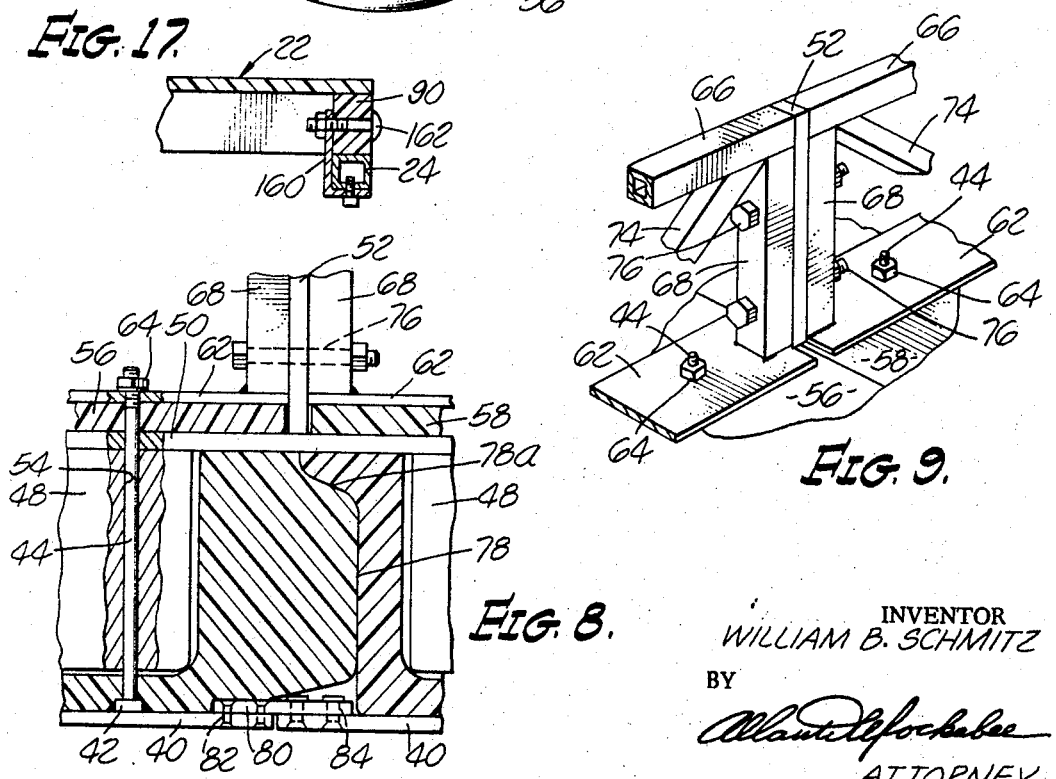

INVENTOR
WILLIAM B. SCHMITZ
BY
ATTORNEY

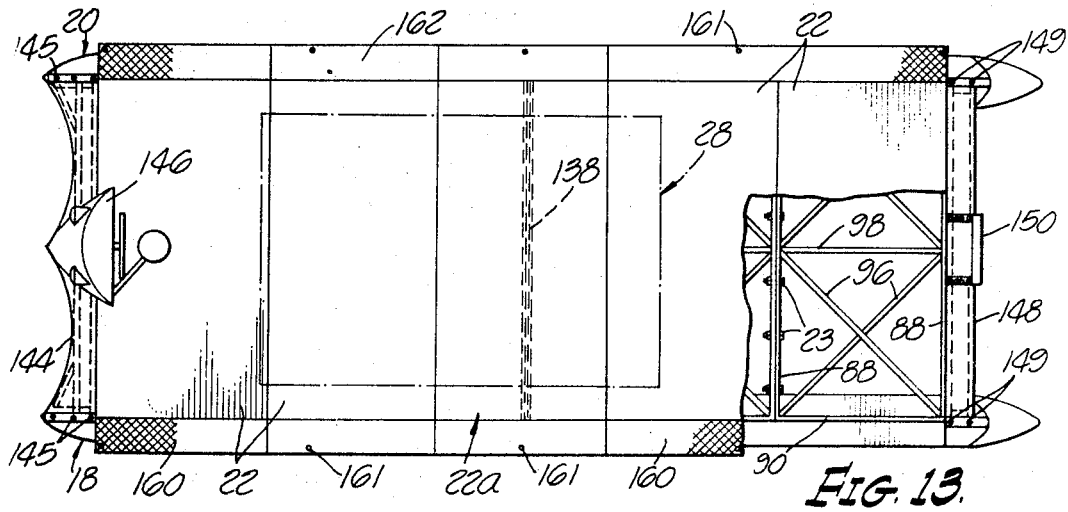
FIG. 13.
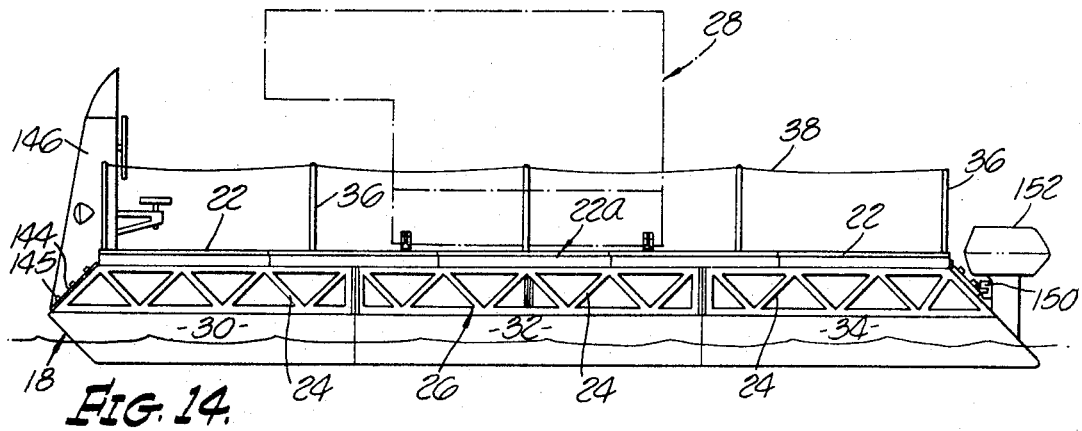
FIG. 14.
FIG. 15.
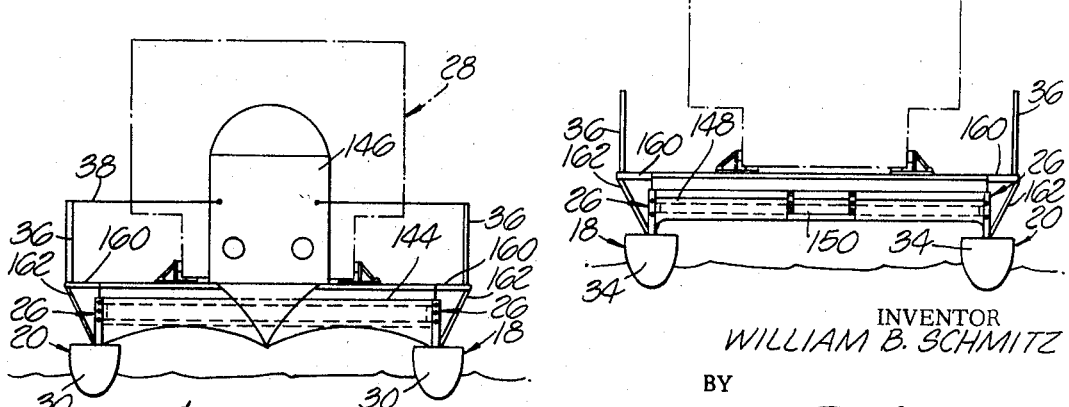
FIG. 16.
INVENTOR
WILLIAM B. SCHMITZ
BY
ATTORNEY United States Patent Office 3,436,774
Patented Apr. 8, 1969

3,436,774
WATERCRAFT
William B. Schmitz, 835 Huntington Drive,
San Marino, Calif. 91108
Filed Jan. 9, 1968, Ser. No. 696,598
Int. Cl. B63c *3/08, 7/04*
U.S. Cl. 9—1     5 Claims

ABSTRACT OF THE DISCLOSURE

A method of assembling a catamaran type water structure wherein there is a pair of hulls, a plurality of deck modules and a unitized cabin unit. The hulls are transversely separable into sections preferably no longer than the length of the deck modules, and the hull sections and deck modules being conveniently transportable on a trailer or other suitable vehicle. The unitized cabin preferably is a demountable automobile camper body, and one deck module and the cabin body have means for elevating them to permit the hulls to be placed in supporting position beneath the said deck module, and the cabin body is arranged to be supported by that deck module.

---

This invention relates to a watercraft, and more specifically a knock-down, readily transportable craft of the catamaran type which is provided with a unitized cabin, the latter preferably being an automobile camper body, and the several parts of the cabin being so related that they can be conveniently transported in knock-down or disassembled condition and readily assembled with a minimum of effort and time.

Houseboating is an activity enjoyed by many persons. Many of these same persons also enjoy camping trips and the use of camper bodies on automotive vehicles, such as pickup trucks, has made camping trips convenient and economical.

Conventional houseboats are permanently built watercraft. They are of such size and weight that it is not practical to move them from one body of water to another. They are incapable of traveling from river to river via the sea, and to move them from one lake to another would require expensive transportation by means of special heavy duty moving equipment.

It is a general object of the invention to provide a catamaran type watercraft made up primarily of a pair of hulls and a bridging deck structure composed of preferably rectangular deck modules of strong light weight construction, and to utilize as a cabin therefor, a structure such as an automobile camper body which ordinarily is provided with jacks or other elevating means for facilitating the mounting of the body upon and the dismounting thereof from a small automobile truck commonly known as a pickup.

Another object of the invention is to provide a watercraft which is of sufficient size to serve as a practical houseboat, and wherein the deck modules are individually small enough to be transported on a light general utility automobile trailer, and wherein the hulls are each separable transversely and readily connectible, the hull sections being of lengths preferably no greater than the length or greatest dimension of the deck modules so that the hull sections can likewise be transported.

A further object of the invention is to provide a watercraft made up of transversely sectioned and readily connectible hull sections and a plurality of interfitting detachably connected deck modules wherein at least one of these modules is provided with means for elevating it to permit two spaced hulls to be positioned beneath it, and wherein the automobile camper body with its elevating mechanism can be positioned above the elevatable deck module and the two then lowered into position with the deck module spanning or bridging the two spaced hulls, and the camper body can be lowered upon the deck module and the remainder of the craft assembled in a convenient manner in a short time.

A further object of the invention is to provide a light weight yet strong hull construction together with means for strengthening it to provide adequate support for the deck and the cabin comprising the camper body.

A further object of the invention is to provide a method of assembling a craft of the type described above, which method will become apparent from the following description made in connection with the accompanying drawings.

FIG. 6 is a perspective view of one of the hulls with its covers in place;

FIG. 7 is a perspective view of a hull with a strengthening truss secured thereon;

FIG. 8 is an enlarged sectional detail of adjoininig detachable hull sections;

FIG. 9 is an enlarged detail in perspective of the connections between the truss structure and the hull.

FIG. 13 is a plan view of the craft with portions of the deck structure broken away, and with optional lateral deck extensions and with the camper body cabin indicated in broken lines;

FIG. 14 is a side elevational view of the structure in FIG. 13 with an outboard motor mounted on the stern of the craft and safety rail in place.

FIG. 15 is a rear elevational view of the craft in the water with the motor removed and with the camper body cabin shown in broken lines;

FIG. 16 is a front elevational view of the structure shown in FIG. 15; and

FIG. 17 is an enlarged section detail showing the detachable connection of the deck module to the truss on one of the hulls.

Figure 1:
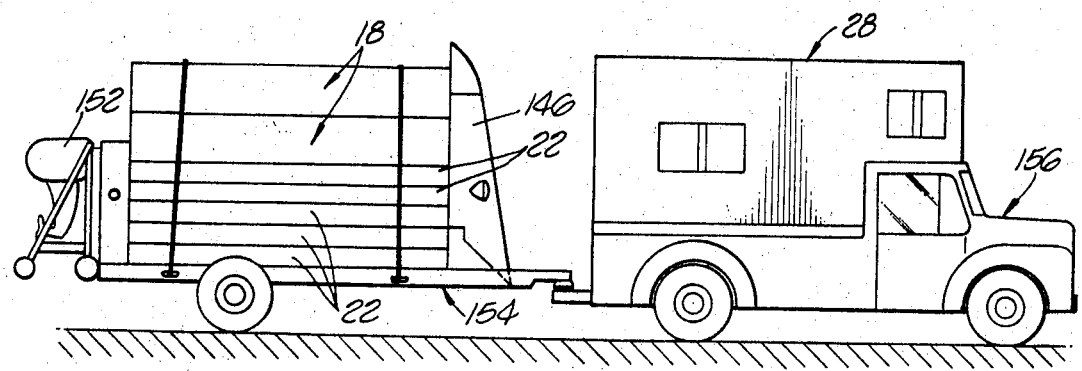
FIG. 1 is a side elevational view of an automotive vehicle with a cabin body thereon and an attached trailer with the watercraft in disassembled condition loaded upon the trailer.
Figure 2:
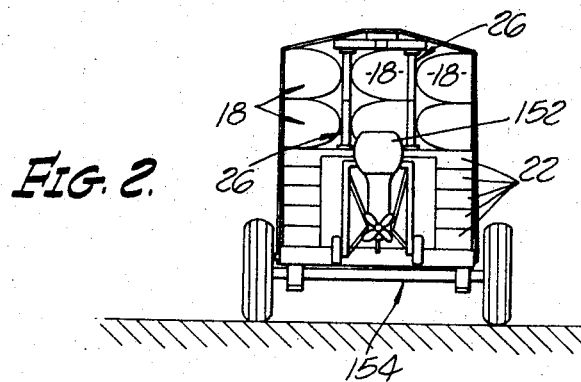
FIG. 2 is a rear elevational view of the loaded trailer shown in FIG. 1.

In FIGS. 13 and 14 the principal elements of the watercraft are illustrated. They include a pair of spaced hulls 18 and 20 between which extend deck modules 22 which are preferably rectangular and of a length to comprise the general width of the craft. The deck modules rest upon and are suitably detachably connected to the several sections 24 of a hull bracing truss 26. As indicated in broken lines, a unitized cabin 28 is mounted upon the deck structure composed of the modules. The hulls 18 and 20 are made up in sections, there being a prow section 30, a midship section 32 and a stern section 34. Posts 36 in suitable sockets in the deck structure support a rope 38 to provide a rail.

Figure 5:
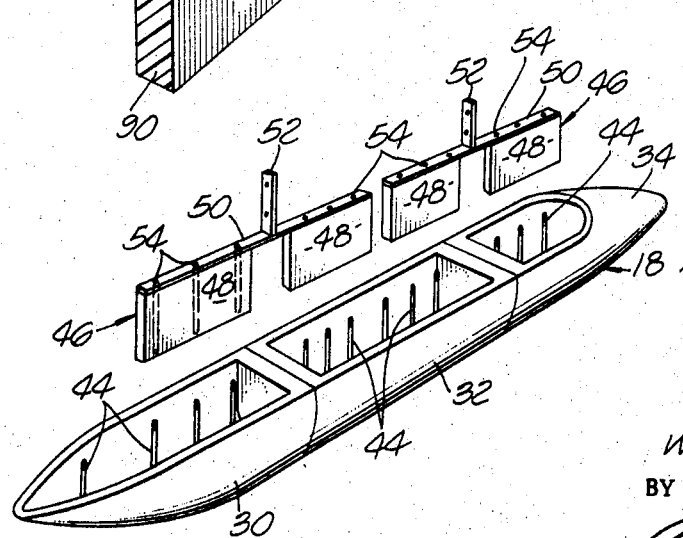
FIG. 5 is an exploded view of one of the sectional hulls with its covers removed and with certain of the bracing structure associated therewith.

Referring to FIG. 6, the hull 18 is illustrated as typical of the two spaced hulls 18 and 20. The sections 32 and 34 of the hull are of a light weight material such as a plastic foam core covered by Fiberglas or other plastic material of the same general construction as certain types of surfboards. Extending along the bottom of each hull section, as shown in FIG. 8, is a longitudinal keel plate section 40. Suitably secured thereto as at 42 at spaced points along the keel plate are upstanding bolts 44, the upper portions of which are shown in FIG. 5. Also illustrated in FIG. 5 are stiffener units 46 made up of vertical panels 48 secured together in pairs by metal straps 50, each of which has a medial vertical strap portion 52 suitably secured thereto as by welding. The vertical stiffening panels 48 are vertically bored as at 54 to receive the upstanding bolts 44 which, as shown in FIG. 6, extend upwardly through hull cover sections 56, 58 and 60. The vertical members 52 on the metal straps 50 extend upwardly above the hull covers as shown in FIG. 6, for a purpose to be described.

Extending along the top of each hull is the hull strengthening truss 26 made up of the sections 24. These may be of light weight material, such as aluminum tubing. Each truss section includes an elongated bottom plate 62 through which the upstanding bolts 44 extend. Nuts 64, removably threaded on the bolts 44, tie the truss between plates 62, the hull covers 56, 58 and 60, and the strengthening spacers 48 to the hull proper.

In addition to the elongated bottom plates 62 the truss sections 24 include top rails 66, vertical posts 68, and at the bow and stern end of the truss structure, slanting end posts 70 and 72 respectively. The web of each truss section comprises diagonal bracing elements 74.

As shown in FIG. 9, adjacent vertical posts 68 of adjacent ends of the truss sections lie at either side of the vertically extending strap 52 which extends upwardly from the horizontal straps 50 at the top of spacer elements 48. Readily detachable nutted bolts 76 extend between the truss posts 68 and through the vertical strap 52.

FIG. 8 illustrates the abutting ends of a pair of hull sections, such as sections 30 and 32. The line 78 indicates the line of separation and consequently the line of abutment of the adjacent ends of the two hull sections. This separation is shown to extend upwardly generally vertically and thence in a reverse curve 78a at the top. The hull keel plates 40 are connected by a strap 80. One end of the strap is secured by rivets 82 to one of the keel plates 40 and the other end is connected by suitable removable bolts 84 to the adjacent end of the keel plate. The keel plates and the connector strap 80, while generally rigid, have sufficient flexing ability so that when the hulls are placed under load in the water, the abutting ends of the hull sections along the line 78 will be pressed tightly together.

Figure 3:
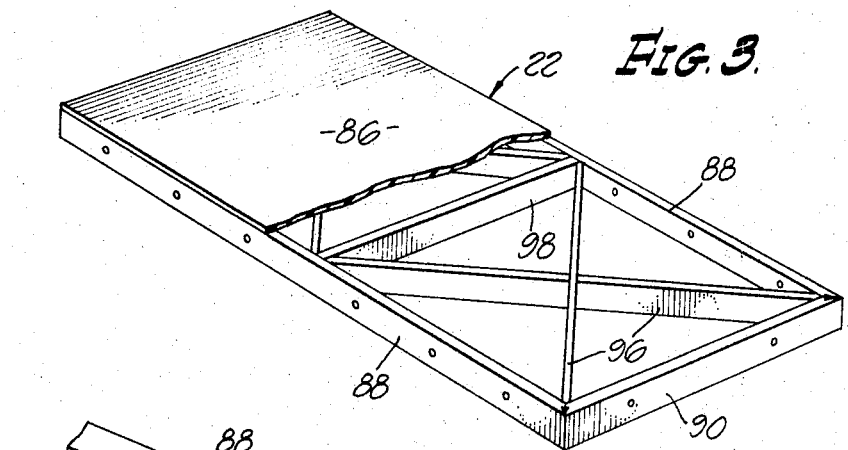
FIG. 3 is a perspective view of a typical deck module with portions broken away to show underlying bracing structure.
Figure 4:
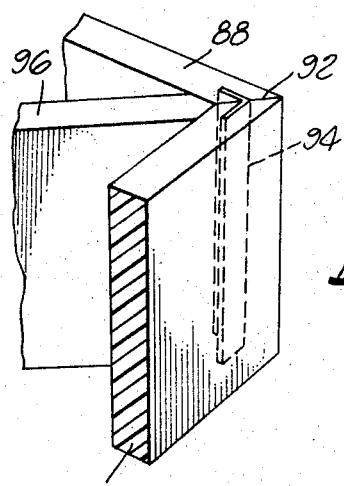
FIG. 4 is an enlarged fragmentary detail of one of the deck module corners.

FIG. 3 shows the construction of one of the deck modules 22. The major portion thereof is a rectangular piece of decking 86 preferably of plastic foam having an outer skin made of layers of Plexiglas. The details of this decking are not shown since, as stated above, it is similar to the construction of devices such as surfboards. The decking 86 is supported by longitudinal frame members 88 connected at their ends by cross members 90, a typical corner construction being illustrated in FIG. 4. The ends of the frame members 88 and 90 are beveled and abut at 92, and the frame members are joined by aluminum or other metal angles 94. At their abutment 92, the frame members are preferably bonded by a suitable cement, such as an epoxy resin. Diagonal cross braces 96 suitably connect the frame members at their corners and medial cross braces 98. Braces 96 and 98 may be anchored by means of an epoxy resin.

Figure 10:
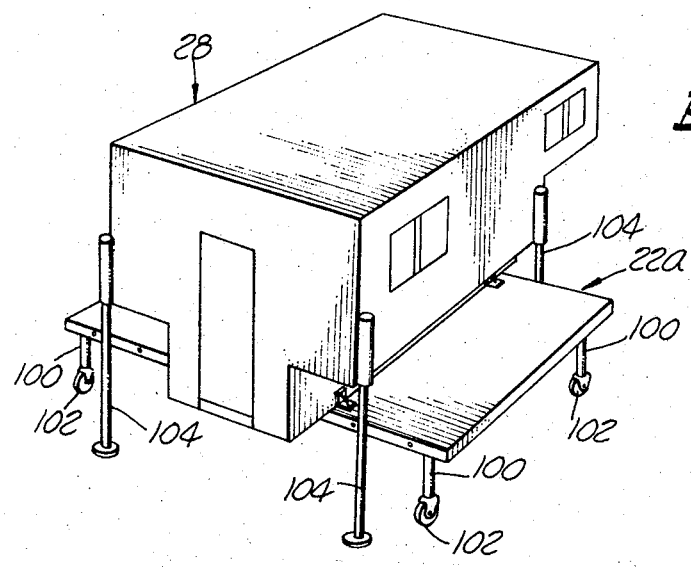
FIG. 10 is a perspective view of an automobile camper body in an elevated position on its jack means and a deck module supported in an elevated position beneath the camper body by a jack means carried by said deck module.
Figure 11:
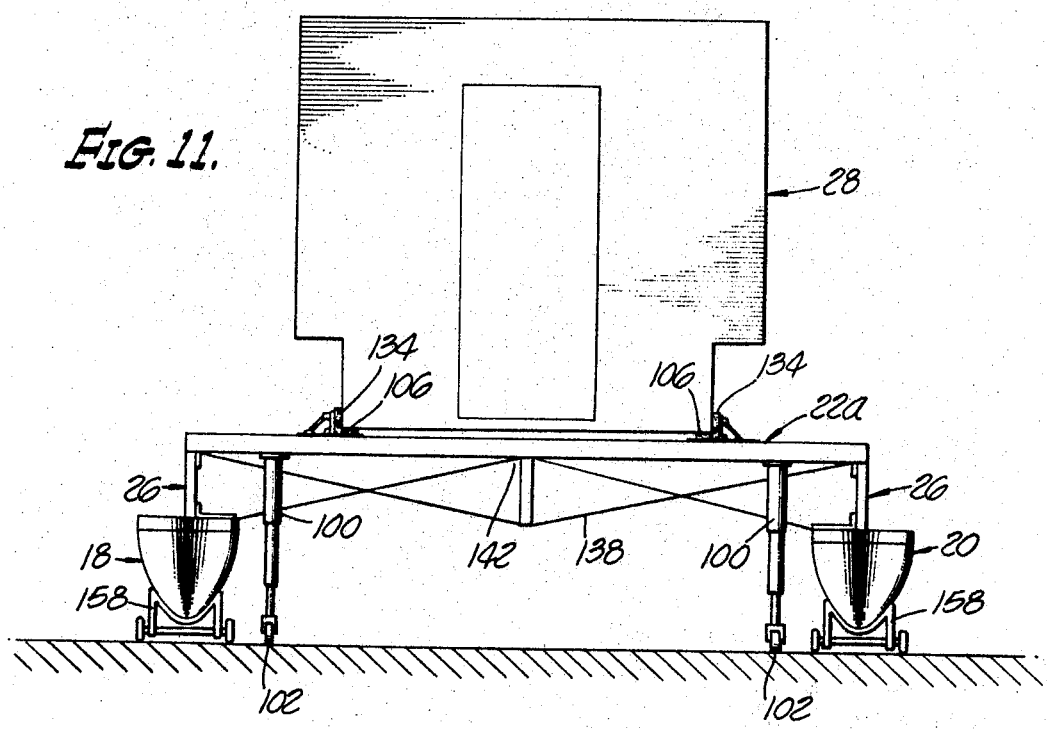
FIG. 11 is a rear elevational view of the structure of FIG. 10, but with the hulls in attached position and resting upon suitable dollies.

In FIG. 10 there is shown a deck module designated 22a which is of the same construction as the other deck modules but is provided with suitable elevating jacks 100. The details of the jacks are not illustrated, but they may be in the form of conventional screw jacks as is well known to the ordinary mechanic. These jacks may be provided with casters 102 on their bottom ends. The deck module 22a is provided with means for the cushioned support and anchoring of the cabin 28, which as previously explained is preferably a camper body such as is customarily mounted upon automotive vehicles, such as pickup trucks. The camper body has its length disposed transversely of the deck module 22a, as illustrated in FIGS. 11 and 13. The camper body, as shown in FIG. 10, is provided with the customary jacks 104 which are used to support the body in an elevated position for mounting upon and dismounting from pickup trucks.

The deck module 22a is provided with suitably positioned rubber block cushions 106, preferably four in number, to rest under spaced portions of the bottom of the camper body 28. Positioned adjacent the ends of the camper body and at opposite sides thereof are straps 108 pivoted at 110 to plates 112 secured to the deck module 22a by nutted bolts 114. The bolts 114 pass through upper and lower straps 116 which are also secured by nutted bolts 118 to clamp the straps to the deck module 22a. The upper strap 116 at one end thereof has a ball socket 120 welded thereon to removably receive a ball 122 on the lower end of an internally threaded sleeve 124 into which is threaded a bolt 126, the upper end of which is threaded through a barrel nut 128. The barrel nut is mounted in a bracket 130 which is welded to the upper end of the pivoted strap 108. A lock nut 132 on the bolt 126 locks said bolt against movement when the nut is tightened against the upper end of the internally threaded sleeve 124. The strap 108 carries a rubber clamping cushion 134 which, as shown, bears against the lower side portion of the camper body or cabin 28. The lower portion of the clamping cushion 134 lies over a suitable strip 136 secured along the lower side portion of the camper body cabin 28. When the lock nut 132 is loosened, the threaded bolt 126 can be easily rotated in the internally threaded sleeve 134 to telescope the bolt 126 inwardly in the internally threaded sleeve 124 sufficiently to permit removal of the wall 122 from the ball socket 120, thereby permitting the pivoted strap 108 to be swung outwardly and downwardly with respect to the camper body 28 to release the same.

The truss structures 26 which run along the tops of the hulls 18 are connected by braces 138 whose ends are detachably secured to the truss structures by nutted bolts 124. The center of the brace assembly 138 is flattened at its central upper portion 142 to engage and act as a support beneath the respective deck module 22 beneath which it extends.

The bow ends of the trusses 26 may be connected and braced by a transverse member 144 which may be secured by bolts 145, or otherwise secured for ready detachment. Also suitably connected to the transverse bow modules 144 is a suitable control unit 146 which may accommodate steering and motor controls not shown since they may be of any conventional known structure.

The stern portions of the hulls 18 are connected by cross structure 148 which also may be detachably connected to the hulls by removable bolts 149, the details of which are not illustrated. The stern cross structure 148 carries a suitable transom plate 150 upon which an outboard motor 152 may be mounted.

The dissassembled watercraft may be carried on a two wheel trailer 154 connected on the back of a pickup truck 156 upon which is mounted the camper body cabin 28. The specific arrangement of the components of the watercraft on the trailer 154 is not critical and is shown only in a general manner. It does show the deck modules 22, the hull sections indicated by the general reference character 18, and the hull strengthening trusses by the general reference character 26. The other incidental components, such as hull covers 56, 58 and 60, and the hull stiffeners 48, can be mounted on the trailer in any convenient spaces.

When the craft is to be set up, the intermediate deck module 22a is placed in an elevated position by its jacks 100, as indicated in FIG. 10. The deck module 22a is elevated to a height which will permit the hulls with the truss structures 26 thereon to be wheeled on dollies 158 to just beneath the ends of each deck module 22a. As shown in FIG. 17, longitudinally spaced upper portions of the truss members 26 carry angled brackets 160 to which the end frame members 90 of the deck modules are detachably secured by nutted bolts 162. However, prior to placement of the hulls under the deck module 22a, said deck module is first positioned beneath the camper body 28 after said camper body has been removed from the truck 156 and is supported in an elevated position by its jack 104. After the hulls have been positioned beneath and secured to the intermediate deck module 22a the braces 148 are secured between the hull trusses 24 and the then remaining deck modules 22 are arranged, as shown in FIG. 13, and secured to the trusses and to each other by readily releasable nutted bolts 23.

Figure 12:
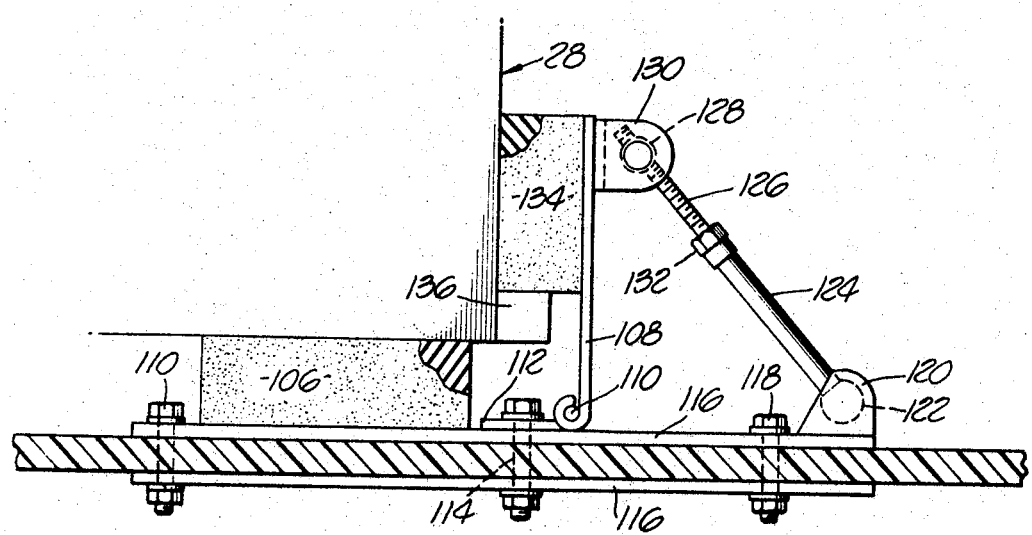
FIG. 12 is an enlarged sectional detail of means for supporting and clamping the camper body to the deck module upon which it rests.

The jacks 100 supporting the intermediate deck module 22a are actuated to relieve them of the weight of said module placing it entirely upon the trusses 24, and the camper body cabin 28 is then lowered by means of its jacks 104 to a position of rest upon the deck module 22. Then the clamps illustrated in FIG. 12 are swung into position with their pads 134 engaging the sides of the camper body 28, the threaded bolt 136 rotated to place clamping pressure upon the pads 134 after the internally threaded sleeve 124 is positioned with its ball 122 in the socket 120. The bow brace structure 144 and the stern brace structure 148 are bolted into position between the bow and stern ends respectively of the hull units. The railing posts 36 are inserted in suitable sockets in the deck structure to provide a railing, and upon mounting of the motor 152, the craft is in condition for operation.

From the foregoing it will be seen that I have provided a knock-down watercraft which can be disassembled and assembled in a comparatively short space of time, and when disassembled, can be transported readily by trailer from one body of water to another. The components are such that when disassembled the major portions, such as the deck modules 22, the hull sections, 30, 32 and 34, and the truss sections 24, are of approximately the same lengths and the lengths thereof are convenient for a trailer mounting and transportation within the size limits specified by highway regulations.

The camper body cabin, as its identifying term implies, is one which can be used on an automotive vehicle in the usual manner while the disassembled watercraft proper is being trailered to a body of water, and then can be used as a cabin of the watercraft when the latter is assembled for use. Alternately, the camper body can be kept on the automotive vehicle if desired, and the watercraft used without a cabin.

In some cases camper bodies are made wider than in others and there may be insufficient room on the deck structure to conveniently pass by the camper body cabin from one end of the craft to another. In such an event, outboard gratings 160 are detachably secured to the ends of the deck modules 22 by readily releasable nutted bolts (not shown), and said gratings can be provided with sockets 161 to removably receive railing posts 36. If desired, as shown in FIG. 16, the outboard extensions or gratings 160 may be supported additionally from the bottom of the truss structures 24 by means of suitable deck braces 162.

I claim:

1. A method of assembling a catamaran type watercraft having a pair of hulls, a plurality of deck modules and a unitized cabin unit, wherein the improvement comprises: temporarily supporting the cabin unit at a predetermined elevation, supporting one of the deck modules in an elevated position beneath the cabin unit, positioning the hulls in laterally spaced relation beneath said one deck module while the module is in its elevated position, and lowering said deck module and the cabin unit to positions wherein the deck module bridges and is supported by the hulls, and the cabin unit is supported by the deck module.

2. The method of claim 1, and placing additional deck modules in edge-to-edge position supported by and bridging said hulls to provide a complete deck unit, fastening the deck modules together, and securing the deck unit to said hulls.

3. A method of assembling a catamaran type watercraft from a pair of hulls, at least one deck module and a normally automobile-mounted camper body having jack means for holding it in an elevated position for placement upon and removal from an automobile, wherein the improvement comprises: jacking the camper body upwardly to a position freeing it from the automobile removing the automobile from beneath the camper body, while maintaining the camper body in its upwardly jacked position, independently supporting one of the deck modules in an elevated position beneath the camper body, positioning the hulls in laterally spaced relation beneath the elevated deck module, lowering the camper body and deck module to positions whereby the deck module is supported between and by the hulls and the camper body is supported by the deck module, and securing the deck modules to the hulls.

4. A watercraft capable of overland transportation in a disassembled condition for assembly at its point of use, wherein the craft included pontoon-like hull members and a bridging deck, wherein the invention comprises: a plurality of deck modules having means for detachably interconnecting them to provide an overall deck structure with sides and bow and stern ends, a pair of said pontoon-like hull members for positioning beneath the sides of the deck structure, one of said deck modules having a dimension defining the width of the overall deck structure and having means for raising it to an elevation sufficient to position the hull members beneath it, and means detachably connecting the sides of the overall deck structure to said hull members, and the lengths of said hulls being greater than the length of said deck modules, said hulls each having transverse separations defining separable sections, said sections having relatively flexible separable connections at their bottom portions capable of springing under load applied to the hulls to bring the hull sections closely together at said separations.

5. A watercraft capable of overland transportation in a disassembled condition for assembly at its point of use, wherein the craft included pontoon-like hull members and a bridging deck, wherein the invention comprises: a plurality of deck modules having means for detachably interconnecting them to provide an overall deck structure with sides and bow and stern ends, a pair of said pontoon-like hull members for positioning beneath the sides of the deck structure, one of said deck modules having a dimension defining the width of the overall deck structure and having means for raising it to an elevation sufficient to position the hull members beneath it, and means detachably connecting the sides of the overall deck structure to said hull members, each hull comprising a light weight buoyant body portion with strengthening means comprising an elongated keel plate extending longitudinally along the underside of the hull, tie bars secured to the keel and extending upwardly through the hull, truss means extending longitudinally along the upper side of the hull, means detachably connecting the tie bars to the truss means, and said means detachably connecting the sides of the overall deck structure to the hull members comprising said truss means and detachable connection between said deck structure and the truss means.

References Cited

UNITED STATES PATENTS

| | | | |
|---|---|---|---|
| 3,090,975 | 5/1963 | Franks | 9—1 |
| 3,199,127 | 8/1965 | Hunter | 9—1 |
| 3,335,437 | 8/1967 | Judkins | 9—1 |

TRYGVE M. BLIX, *Primary Examiner.*